(12) United States Patent
Schoen

(10) Patent No.: US 10,137,946 B2
(45) Date of Patent: Nov. 27, 2018

(54) VEHICLE UNDERBODY PANEL ASSEMBLY

(71) Applicant: Robert M Schoen, Oxford, MI (US)

(72) Inventor: Robert M Schoen, Oxford, MI (US)

(73) Assignee: FCA US LLC, Auburn Mills, MI (US)

( * ) Notice: Subject to any disclaimer, the term of this patent is extended or adjusted under 35 U.S.C. 154(b) by 0 days.

(21) Appl. No.: 15/159,093

(22) Filed: May 19, 2016

(65) Prior Publication Data

US 2017/0334492 A1   Nov. 23, 2017

(51) Int. Cl.
*B62D 25/20* (2006.01)
*B62D 35/02* (2006.01)

(52) U.S. Cl.
CPC ............... *B62D 35/02* (2013.01); *Y02T 10/88* (2013.01)

(58) Field of Classification Search
CPC ........................... B62D 25/2072; B62D 35/02
USPC ..... 296/180.1, 187.03, 38; 280/304.03, 770; 180/69.1, 309, 68.1, 68.2, 68.3, 89.2
See application file for complete search history.

(56) References Cited

U.S. PATENT DOCUMENTS

| | | | |
|---|---|---|---|
| 1,630,639 A * | 5/1927 | Taylor | B60P 3/073 184/106 |
| 3,279,557 A | 10/1966 | Halun | |
| 4,655,307 A | 4/1987 | Lamoureux | |
| 4,772,060 A * | 9/1988 | Kretschmer | B62D 35/02 296/180.1 |
| 4,936,418 A * | 6/1990 | Clausen | F16N 31/006 180/69.1 |
| 7,270,206 B2 | 9/2007 | Guertler | |
| 2003/0168267 A1 * | 9/2003 | Borroni-Bird | B60G 3/18 180/68.1 |

* cited by examiner

*Primary Examiner* — D Glenn Dayoan
*Assistant Examiner* — Sunsurraye Westbrook
(74) *Attorney, Agent, or Firm* — Ralph E. Smith

(57) ABSTRACT

A vehicle includes a vehicle body having an underside and a mesh underbody panel. The mesh underbody panel is attached to the underside of the vehicle body, thereby, shielding vehicle components from a ground surface. The vehicle is situated such that the mesh underbody panel and the ground surface define a pathway through which air flows while the vehicle is in motion. The mesh underbody panel includes apertures extending therethrough that allow airflow through the mesh underbody panel while the vehicle is stopped or traveling within a low-speed range and restrict airflow through the mesh underbody panel while the vehicle is traveling within a high-speed range.

9 Claims, 4 Drawing Sheets

VEHICLE UNDERBODY PANEL ASSEMBLY

FIELD

The present disclosure relates to a vehicle underbody panel assembly.

BACKGROUND

This section provides background information related to the present disclosure and is not necessarily prior art.

Improving fuel economy of automotive vehicles is an increasingly important challenge faced by modern automotive manufacturers. Significant influences on fuel economy include mass of the vehicle and aerodynamics of the vehicle. Many conventional automotive vehicles include panels (e.g., belly pans) attached to the underbody of the vehicle to influence the vehicle's aerodynamics. Such conventional panels cover many, but not all, of the vehicle's underbody components. Such conventional panels cannot completely cover the vehicle underbody because completely covering the underbody with a conventional panel would prevent drainage of moisture, dirt and debris, and would also hinder heat venting from powertrain and exhaust components. The present disclosure provides an underbody panel that can more completely cover the vehicle's underbody components while still providing adequate heat venting and expulsion of moisture, dirt and debris.

SUMMARY

This section provides a generally summary of the disclosure, and is not a comprehensive disclosure of its full scope or all its features.

In one form, a vehicle includes a vehicle body having an underside and a mesh underbody panel. The mesh underbody panel is attached to the underside of the vehicle body, thereby, shielding vehicle components from a ground surface. The vehicle is situated such that the mesh underbody panel and the ground surface define a pathway through which air flows while the vehicle is in motion. The mesh underbody panel includes apertures extending therethrough that allow airflow through the mesh underbody panel while the vehicle is stopped or traveling within a low-speed range and restrict airflow through the mesh underbody panel while the vehicle is traveling within a high-speed range.

In some configurations, the apertures of the mesh underbody panel are angled relative to a longitudinal axis of the vehicle.

In some configurations, the apertures are angled such that the apertures extend toward a rear end of the vehicle as the apertures extend toward the ground surface upon which the vehicle is situated.

In some configurations, the mesh underbody panel is a wire mesh.

In some configurations, the mesh underbody panel includes a plurality of mesh panel sections.

In some configurations, the mesh panel extends from a front location to a rear location, the front location is between a front end of the vehicle and a pair of front wheels of the vehicle, the rear location is between a rear end of the vehicle and a pair of rear wheels.

In some configurations, the mesh underbody panel includes front, middle, and rear mesh panel sections.

In some configurations, the middle mesh panel section has a larger area than the front and rear mesh panel sections.

In some configurations, the middle mesh panel section extends radially outwardly past the front and rear mesh panel sections.

Further areas of applicability of the teachings of the present disclosure will become apparent from the detailed description, claims and the drawings provided hereinafter, wherein like reference numerals refer to like features throughout the several views of the drawings. It should be understood that the detailed description, including disclosed embodiments and drawings referenced therein, are merely exemplary in nature intended for purposes of illustration only and are not intended to limit the scope of the present disclosure, its application or uses. Thus, variations that do not depart from the gist of the present disclosure are intended to be within the scope of the present disclosure.

BRIEF DESCRIPTION OF THE DRAWINGS

Corresponding reference numerals indicate corresponding parts throughout the several views of the drawings.

DETAILED DESCRIPTION

Example embodiments will now be described more fully with reference to the accompanying drawings.

Figure 1:
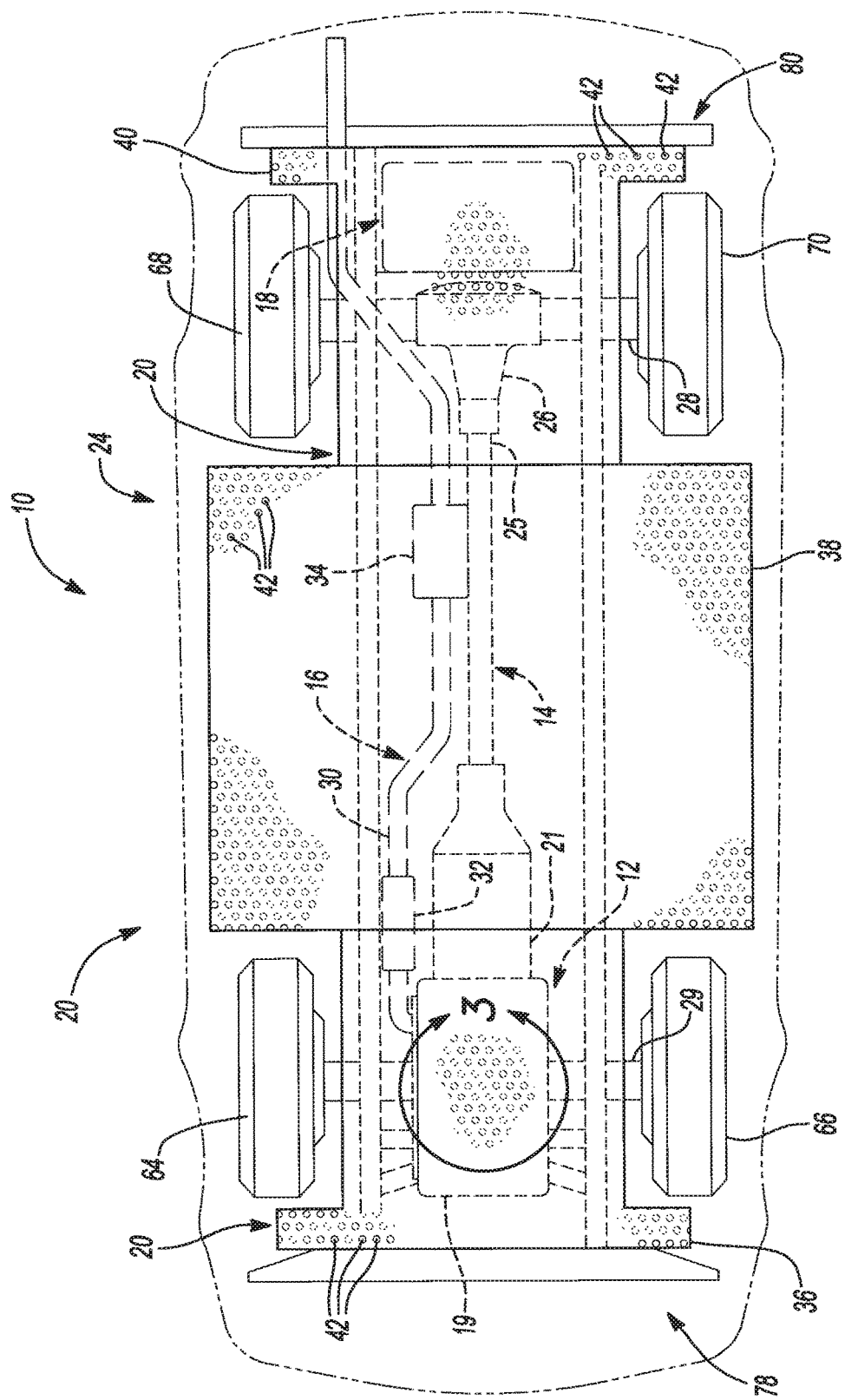
FIG. 1 is a bottom view of a vehicle having an underbody panel assembly according to the principles of the present disclosure.
Figure 2:
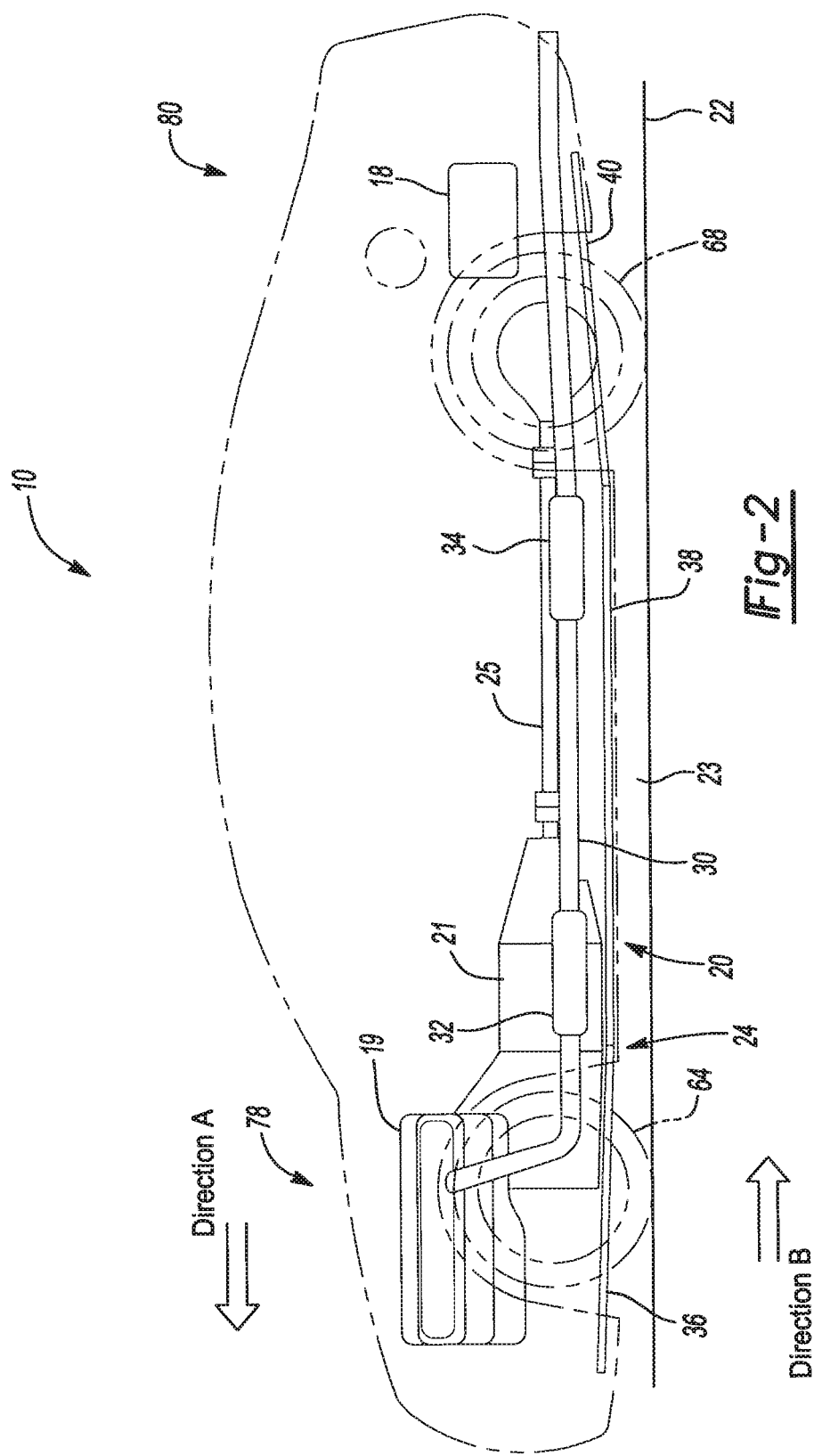
FIG. 2 is a side view of the vehicle having the underbody panel assembly shown in FIG. 1.

With reference to FIGS. 1 and 2, a vehicle 10 is provided that includes a powertrain system 12, a drivetrain system 14, an exhaust system 16, a fuel tank 18, and an underbody panel assembly 20. The underbody panel assembly 20 is attached to an underside 24 of the vehicle 10 between systems 12-18 (i.e., the powertrain system 12, the drivetrain 14, the exhaust system 16 and the fuel tank 18) and a ground surface (e.g., a roadway 22 shown in FIG. 2), thereby at least partially shielding some or all of the components 12-18 and/or additional or alternative vehicle components. The underbody panel assembly 20 and the ground surface 22 define a pathway 23 (FIG. 2) therebetween through which air flows while the vehicle 10 is in motion. As will be described in more detail below, the underbody panel assembly 20 allows heating venting and moisture drainage when the vehicle 10 is traveling at relatively low speeds and restricts or prevents airflow therethrough when the vehicle 10 is traveling at relatively high speeds to improve vehicle aerodynamics at high speeds.

The systems 12-18 can be conventional systems, for example. In the particular configuration shown in the figures, the powertrain system 12 includes, inter alia, an engine 19 and a transmission 21. The drivetrain system 14 includes, inter alia, a propeller shaft 25, a differential 26, a rear axle 28 and a front axle 29. The exhaust system 16 includes, inter alia, an exhaust pipe 30, a catalytic converter 32 and a muffler 34. As shown in FIGS. 1 and 2, the underbody panel assembly 20 at least partially shields the engine 19, transmission 21, propeller shaft 25, differential 26, rear axle 28, front axle 29, exhaust pipe 30, catalytic converter 32, muffler 34, and fuel tank 18. That is, the underbody panel assembly 20 shields these components and/or other components from debris and airflow while the vehicle 10 is moving.

While the vehicle 10 is depicted in the figures and described above as having the engine 19, the exhaust system 16 and fuel tank 18, it will be appreciated that the underbody panel assembly 20 can be installed on any vehicle, including electric vehicles, for example, or other vehicles that do not have combustion engines. Further, it will be appreciated that the configuration of the systems 12-18 described above and shown in the figures is merely exemplary, and the principles of the present disclosure are applicable to any type of vehicle.

As shown in FIG. 1, the underbody panel assembly 20 is shaped to correspond to the shape of the underside 24 of the vehicle 10 and can be made out of a metallic and/or polymeric material. The underbody panel assembly 20 includes a front mesh panel section 36, a middle mesh panel section 38, and a rear mesh panel section 40. The underbody panel assembly 20 front, middle, and rear mesh panel sections 36, 38, 40 described herein are for illustrative purposes, and it should be understood that the underbody panel assembly 20 can include a different number of mesh panel sections (e.g., 1, 2, or 4, for example) based on the specific design needs of the vehicle. In the particular configuration shown in the figures, the middle mesh panel section 38 is larger in area than the front mesh panel section 36 and the rear mesh panel section 40. The middle mesh panel section 38 is also positioned between the front mesh panel section 36 and the rear mesh panel section 40, and extends laterally outward past the front and rear mesh panel sections 36, 40.

Figure 3:
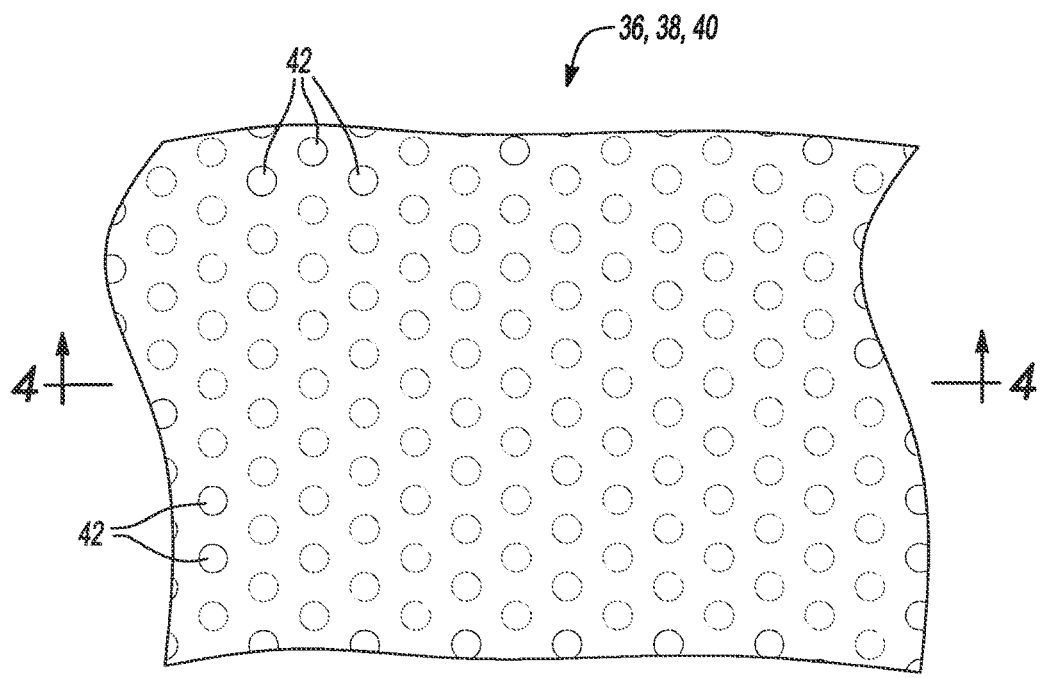
FIG. 3 is a cutaway view of a mesh panel section of the underbody panel assembly taken along line 3-3 of FIG. 1.
Figure 4:
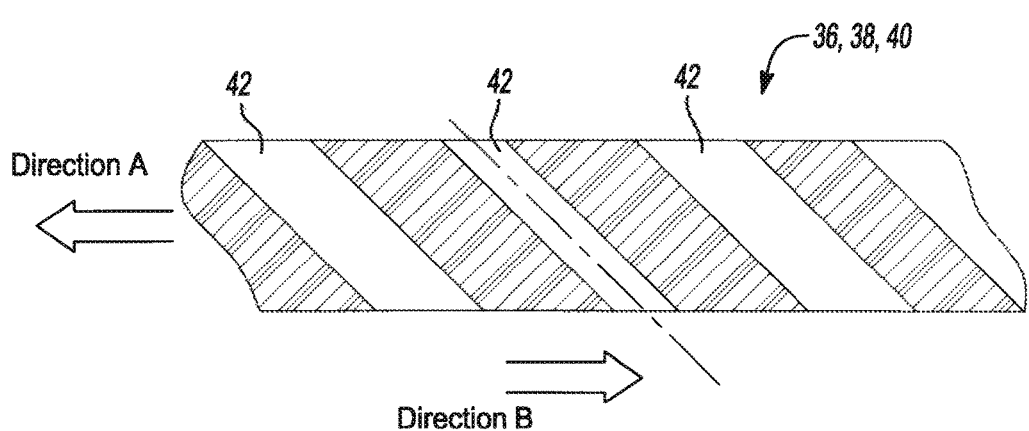
FIG. 4 is a cross-sectional view of the mesh panel section taken along line 4-4 of FIG. 3.

As shown in FIG. 1, the front mesh panel section 36 is positioned at a front end 78 of the vehicle 10 partly between front wheels 64, 66. The front mesh panel section 36 covers the front axle 29, the engine 19 and portions of the transmission 21, exhaust pipe 30 and catalytic converter 32. The front mesh panel section 36 includes apertures 42. As shown in FIGS. 3 and 4, the apertures 42 can have a circular shape (or any other shape) and can be angled such that the apertures 42 extend toward a rear end 80 of the vehicle 10 as the apertures 42 extend toward a ground surface 22 upon which the vehicle is situated. The front mesh panel section 36 can include apertures 42 of different diameters based on design specifications of the vehicle. For example, the apertures 42 covering the catalytic converter 32 can have larger diameters compared to the apertures 42 covering the front axle 29 in order to allow more airflow therethrough in that locality when the vehicle 10 is traveling at relatively low speeds.

As shown in FIG. 1, the middle mesh panel section 38 is generally a rectangular shape. The middle mesh panel section 38 is positioned between the front wheels 64, 66 and rear wheels 68, 70. The middle mesh panel section 38 also extends in lateral directions at least as far as the wheels 64, 66, 68, 70. The middle mesh panel section 38 covers the exhaust pipe 30, muffler 34, and part of the catalytic converter 32 while also covering part of the transmission 21 and part of the propeller shaft 25. The middle mesh panel section 38 also includes apertures 42 extending therethrough that are similar or identical to those of the front mesh panel section 36 (FIG. 3).

As shown in FIG. 1, the rear mesh panel section 40 is positioned partly between rear wheels 68, 70. The rear mesh panel section 40 covers the fuel tank 18, the differential 26, the rear axle 28, part of the propeller shaft 25, and part of the exhaust pipe 30. The rear mesh panel section 40 also includes apertures 42 extending therethrough. The apertures 42 in the rear mesh panel section 40 are also similar or identical to those of the front and middle mesh panel sections 36, 38 (FIG. 3).

With continued reference to FIGS. 1-4, operation of the underbody panel assembly 20 will be described in detail. While the vehicle 10 is driving (e.g., in Direction A in FIGS. 2 and 4) within a high-speed range, the underbody panel assembly 20 acts as a solid surface, thereby, forcing the airflow (Direction B in FIGS. 2 and 4) to circumvent the apertures 42 in the underbody panel assembly 20. That is, as speed of the vehicle 10 increases, more and more air will flow across the apertures 42 in the underbody panel assembly 20 (rather than through the apertures 42) such that when the vehicle 10 is travelling with the high-speed range, most or all of the air flowing under the vehicle 10 will flow across the apertures 42 and little or no fluid (air or moisture), solid matter or heat will flow through the apertures 42. In some embodiments, the high-speed range (i.e., the range of speeds at which airflow circumvents the apertures 42) includes speeds greater than 40 miles per hour. In some embodiments, the high-speed range includes speeds greater than 50 miles per hour. In some embodiments, the high-speed range includes speeds greater than 30 miles per hour. By acting as a solid surface at high vehicle speeds, the underbody panel assembly 20 improves the aerodynamics of the vehicle 10 (i.e., reduces wind resistance) when improved aerodynamics is most beneficial to fuel efficiency.

In addition to providing aerodynamics benefits at high speeds, the apertures 42 in the front, middle, and rear mesh panel sections 36, 38, 40 allow airflow, drainage and heat transfer therethrough while the vehicle 10 is driving within a low-speed range (i.e., speeds where aerodynamic benefits are not as much of a necessity). That is, as speed of the vehicle 10 decreases, more and more air will flow through the apertures 42 in the underbody panel assembly 20 (rather than across the apertures 42) such that when the vehicle 10 is travelling with the low-speed range, some of the air flowing under the vehicle 10 will flow into and through the apertures 42 and moisture, debris and/or heat drains or vents through the apertures 42. In other words, while the vehicle 10 is driving in Direction A (FIGS. 2 and 4) within the low-speed range, air flows through the apertures 42 of the front, middle, and rear mesh panel sections 36, 38, 40 to convectively vent heat to provide adequate cooling of various components (e.g., components of systems 12-18) of the vehicle 10 and allow any moisture and/or debris to drain through the apertures 42.

In some embodiments, the low-speed range (i.e., the range of speeds at which air can flow through the apertures 42) includes speeds less than 40 miles per hour. In some embodiments, the low-speed range includes speeds less than 50 miles per hour. In some embodiments, the high-speed range includes speeds less than 30 miles per hour. It will be appreciated that the speeds at which air flow can or cannot flow through the apertures 42 will depend on the aerodynamic characteristics of the vehicle 10 and the underbody panel assembly 20, including, for example, the shape of the vehicle 10 body, the shape and positioning of the front, middle, and rear panel sections 36, 38, 40, and the shape and size of the apertures 42.

Figure 5:
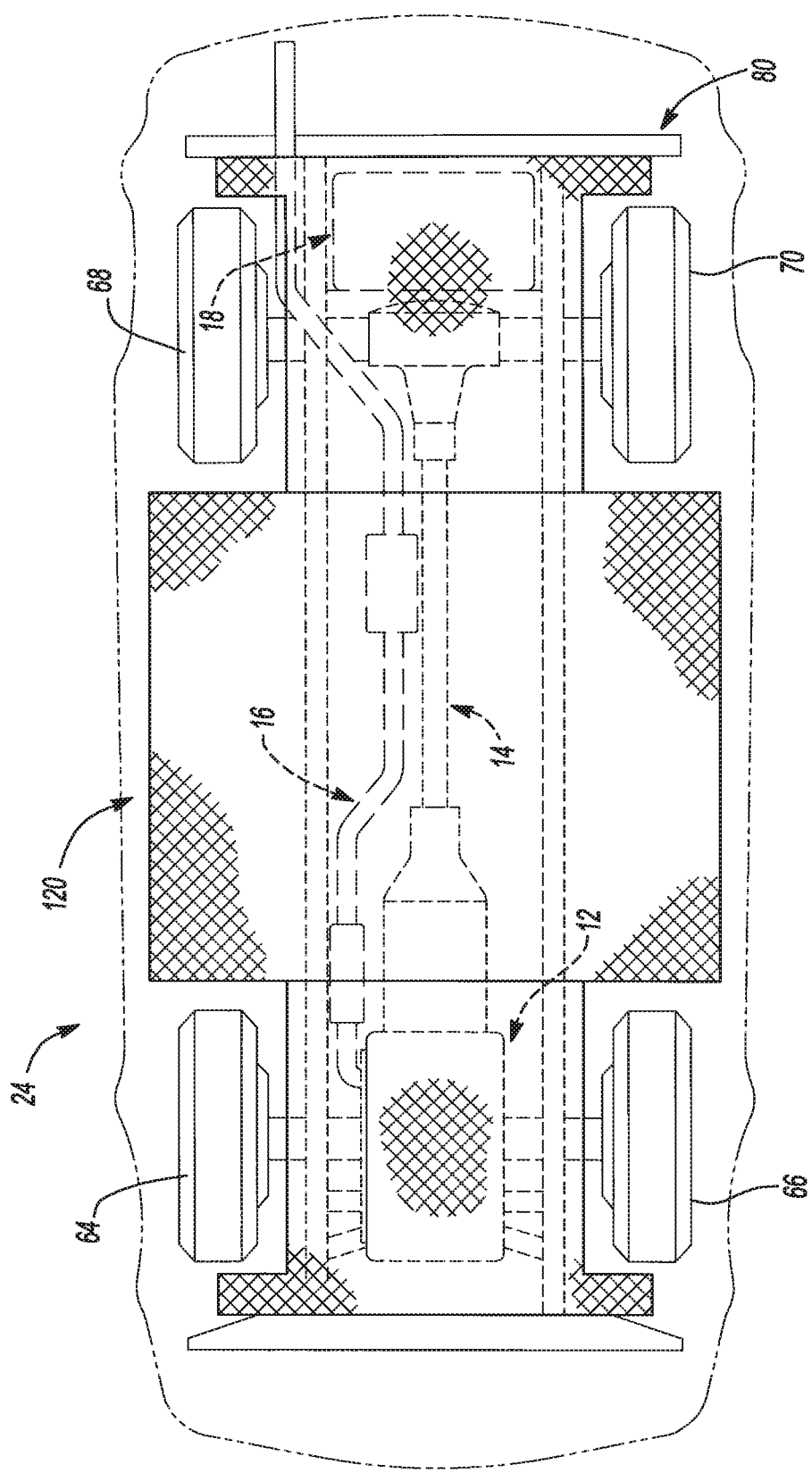
FIG. 5 is a bottom view of another underbody panel assembly mounted on a vehicle according to the principles of the present disclosure.

With reference to FIG. 5, a wire mesh 120 is provided that is shaped to correspond to the shape of the underside 24 of the vehicle 10 instead of the underbody panel assembly 20. The function of the wire mesh 120 is similar or identical to that of the underbody panel assembly 20 described above.

What is claimed is:

1. A vehicle comprising:
a vehicle body having an underside; and
a mesh underbody panel attached to the underside of the vehicle body and shielding vehicle components from a ground surface upon which the vehicle is situated such that the mesh underbody panel and the ground surface define a pathway through which air flows while the vehicle is in motion, the mesh underbody panel having apertures extending therethrough that allow airflow through the mesh underbody panel while the vehicle is stopped or traveling within a low-speed range and restrict airflow through the mesh underbody panel while the vehicle is traveling within a high-speed range,
wherein the apertures are angled such that the apertures extend toward a rear end of the vehicle as the apertures extend toward the ground surface upon which the vehicle is situated.

2. The vehicle of claim 1, wherein the apertures of the mesh underbody panel are angled relative to a longitudinal axis of the vehicle.

3. The vehicle of claim 1, wherein the mesh underbody panel is a wire mesh.

4. The vehicle of claim 1, wherein the mesh underbody panel includes a plurality of mesh panel sections.

5. The vehicle of claim 1, wherein the mesh underbody panel extends from a front location to a rear location, the front location is between a front end of the vehicle and a pair of front wheels of the vehicle, the rear location is between a rear end of the vehicle and a pair of rear wheels.

6. The vehicle of claim 1, wherein the mesh underbody panel includes front, middle, and rear mesh panel sections.

7. The vehicle of claim 6, wherein the middle mesh panel section has a larger area than the front and rear mesh panel sections.

8. The vehicle of claim 7, wherein the middle mesh panel section extends laterally outwardly past the front and rear mesh panel sections.

9. The vehicle of claim 1, wherein the mesh underbody panel includes apertures of differing diameters.

* * * * *